United States Patent
Otsubo

(10) Patent No.: US 9,502,891 B2
(45) Date of Patent: Nov. 22, 2016

(54) ESD PROTECTION DEVICE

(71) Applicant: Murata Manufacturing Co., Ltd., Kyoto-fu (JP)

(72) Inventor: Yoshihito Otsubo, Kyoto-fu (JP)

(73) Assignee: MURATA MANUFACTURING CO., LTD., Kyoto-Fu (JP)

(*) Notice: Subject to any disclaimer, the term of this patent is extended or adjusted under 35 U.S.C. 154(b) by 381 days.

(21) Appl. No.: 14/190,936

(22) Filed: Feb. 26, 2014

(65) Prior Publication Data

US 2014/0177114 A1    Jun. 26, 2014

Related U.S. Application Data

(63) Continuation of application No. PCT/JP2012/071225, filed on Aug. 22, 2012.

(30) Foreign Application Priority Data

Aug. 29, 2011    (JP) .................. 2011-185775

(51) Int. Cl.
| | | |
|---|---|---|
| *H02H 9/04* | (2006.01) | |
| *H01T 1/22* | (2006.01) | |
| *H01T 2/02* | (2006.01) | |
| *H01T 4/12* | (2006.01) | |

(52) U.S. Cl.
CPC ................ *H02H 9/044* (2013.01); *H01T 1/22* (2013.01); *H01T 2/02* (2013.01); *H01T 4/12* (2013.01)

(58) Field of Classification Search
CPC ............. H02H 9/044; H01T 1/22; H01T 2/02; H01T 4/12
USPC .................................... 361/56, 220
See application file for complete search history.

(56) References Cited

U.S. PATENT DOCUMENTS

| | | | | |
|---|---|---|---|---|
| 2009/0067113 A1* | 3/2009 | Urakawa | .................. | H01T 4/12 |
| | | | | 361/220 |
| 2010/0309595 A1* | 12/2010 | Adachi | .................... | H01T 1/20 |
| | | | | 361/56 |

FOREIGN PATENT DOCUMENTS

| | | |
|---|---|---|
| JP | 2011-076840 A | 3/2001 |
| WO | 2008/146514 A1 | 12/2008 |
| WO | 2011/099385 A1 | 8/2011 |

OTHER PUBLICATIONS

Written Opinion of the International Searching Authority for Application No. PCT/JP2012/071225 dated Oct. 2, 2012.

(Continued)

*Primary Examiner* — Thienvu Tran
*Assistant Examiner* — Kevin J Comber
(74) *Attorney, Agent, or Firm* — Pearne & Gordon LLP

(57) ABSTRACT

Provided is an ESD protection device that can suppress degradation of discharge characteristics caused by repeated discharge. The ESD protection device comprises (a) a ceramic multilayer substrate 12 in which a plurality of ceramic layers are stacked, (b) a cavity 13 formed inside the ceramic multilayer substrate 12, (c) at least one pair of discharge electrodes 14, 15 including opposing portions 14*t*, 15*t* that are formed along an inner surface of the cavity 13 and that face each other with a spacing held therebetween, and (d) outer electrodes formed on a surface of the ceramic multilayer substrate 12 and connected to the discharge electrodes 14, 15. At least one of the opposing portions 14*t*, 15*t* of the discharge electrodes 14, 15 is connected to one end portion of a via conductor 22, 23 penetrating through the ceramic layer of the ceramic multilayer substrate 12.

16 Claims, 5 Drawing Sheets

(56) References Cited

OTHER PUBLICATIONS

International Search Report for Application No. PCT/JP2012/071225 dated Oct. 2, 2012.

\* cited by examiner

ESD PROTECTION DEVICE

BACKGROUND OF THE INVENTION

1. Field of the Invention

The present invention relates to an ESD protection device, and more particularly to an ESD protection device causing discharge to generate between opposing portions of discharge electrodes, which are exposed to a cavity formed inside a ceramic multilayer substrate.

2. Description of the Related Art

ESD (Electro-Static Discharge) implies a phenomenon that strong discharge occurs when a conductive object (e.g., a human body) charged with electricity contacts with or comes sufficiently close to another conductive object (e.g., an electronic device). The ESD gives rise to a problem such as damage or malfunction of the electronic device. To avoid the problem, an excessive voltage generating in the event of discharge needs to be kept from being applied to circuits of the electronic device. An ESD protection device is used in such a case, and it is also called a surge absorption device or a surge absorber.

The ESD protection device is arranged, for example, between a signal line of a circuit and a ground (earth). The ESD protection device has a structure that a pair of discharge electrodes face each other with a spacing held therebetween. In a state of ordinary use, therefore, the ESD protection device has a high resistance, and a signal does not flow to the ground side. However, if an excessive voltage is applied such as when static electricity is applied from an antenna of a cellular phone, for example, discharge occurs between the discharge electrodes of the ESD protection device, whereby the static electricity can be conducted to the ground. As a result, a voltage due to the static electricity is not applied to circuits downstream of the ESD protection device, and those circuits can be protected.

In an ESD protection device 1 illustrated in a sectional view of FIG. 10, for example, a cavity 3 and discharge electrodes 6 and 8 facing each other with a spacing 5 held therebetween are formed inside a ceramic multilayer substrate 2. The discharge electrodes 6 and 8 include opposing portions 7 and 9 formed along an inner surface of the cavity 3. The discharge electrodes 6 and 8 extend from the cavity 3 to an outer peripheral surface of the ceramic multilayer substrate 2, and they are connected respectively to outer electrodes 6x and 8x, which are formed outside the ceramic multilayer substrate 2, i.e., on the surface of the ceramic multilayer substrate 2. The outer electrodes 6x and 8x are used for mounting of the ESD protection device 1. An auxiliary electrode 4 in which a conductive material is distributed is formed adjacent to the opposing portions 7 and 9 of the discharge electrodes 6 and 8 and to a region where the spacing 5 between the opposing portions 7 and 9 is formed.

When a voltage higher than a predetermined value is applied to the outer electrodes 6x and 8x, discharge occurs between the opposing portions 7 and 9 of the discharge electrodes 6 and 8. With the discharge, the excessive voltage is conducted to the ground, whereby circuits on the downstream side can be protected. A discharge starting voltage can be set by adjusting the spacing 5 between the opposing portions 7 and 9 of the discharge electrodes 6 and 8, the amount and type of the conductive material contained in the auxiliary electrode 4, etc. (see, e.g., Patent Document 1).

Patent Document 1: International Publication No. 2008/146514

BRIEF SUMMARY OF THE INVENTION

In the ESD protection device, when discharge is repeated, the opposing portions of the discharge electrodes are melted or peeled off due to heat and impacts generated during the discharge, and a gap between the opposing portions of the discharge electrodes is increased. As a result, the discharge starting voltage may increase and discharge characteristics may degrade in some cases.

In particular, when the discharge electrodes are formed by printing a conductive paste, as illustrated in a partial sectional view of FIG. 9A, respective ends of opposing portions 14t and 15t of discharge electrodes 14 and 15, which are formed along an inner surface of a cavity 13, are thin in many cases. With the discharge repeated, as illustrated in a partial sectional view of FIG. 9B, a gap between the opposing portions 14t and 15t of the discharge electrodes 14 and 15 tends to increase because the opposing portion 14t of the discharge electrode 14 on the side receiving electrons is peeled off or shortened through melting. Therefore, the problem of degradation of the discharge characteristics is more serious.

In view of the above-described situations in the art, the present invention is intended to provide an ESD protection device that can suppress the degradation of discharge characteristics caused by repeated discharge.

To solve the above-mentioned problems, the present invention provides an ESD protection device constituted as follows.

The ESD protection device includes (a) a ceramic multilayer substrate in which a plurality of ceramic layers are stacked, (b) a cavity formed inside the ceramic multilayer substrate, (c) at least one pair of discharge electrodes that include opposing portions formed along an inner surface of the cavity and that face each other with a spacing held therebetween, and (d) outer electrodes formed on a surface of the ceramic multilayer substrate and connected to the discharge electrodes. At least one of the opposing portions of the discharge electrodes is connected to one end portion of a via conductor penetrating through the ceramic layer of the ceramic multilayer substrate.

In the arrangement described above, when an excessive voltage higher than a predetermined value is applied between the outer electrodes, discharge occurs between the opposing portions of the discharge electrodes, which face each other, whereupon heat and impacts are exerted on the opposing portions of the discharge electrodes. With the structure that the via conductor is connected to at least one of the opposing portions of the discharge electrodes, even when the heat and the impacts generated with the discharge are exerted, the opposing portion of the discharge electrode is less likely to peel off and to melt, and variations of a gap between the opposing portions of the discharge electrodes are reduced. Accordingly, the degradation of discharge characteristic can be suppressed even when the discharge is repeated.

Preferably, the opposing portion of at least one of the discharge electrodes is connected to the one end portion of the via conductor in a region including a tip of the opposing portion of the one discharge electrode, the tip facing the opposing portion of the other discharge electrode through a shortest distance.

In the arrangement described above, the tip of the opposing portion of the one discharge electrode, which faces the opposing portion of the other discharge electrode through the shortest distance, is a portion that is most susceptible to peeling-off in the event of discharge. Since the via conductor is connected to the tip, peeling-off and melting of the opposing portion of the discharge electrode can be suppressed more effectively.

Preferably, an area of the one end portion of the via conductor connected to the opposing portion of the discharge electrode is smaller than an area of the other end portion of the via conductor.

With that feature, since, in the via conductor connected to the opposing portion of the discharge electrode, one end portion on the side closer to the cavity is smaller than the other end portion, the via conductor is inhibited from moving toward the cavity. In other words, displacement of the via conductor toward the cavity is inhibited. Moreover, since the via conductor flares on the side opposite to the cavity, heat is apt to dissipate more easily. As a result, peeling-off and melting of the opposing portion of the discharge electrode, which is connected to the via conductor, can be suppressed even more effectively.

Preferably, the opposing portions of the pair of discharge electrodes are each connected to the one end portion of the via conductor.

With that feature, since the opposing portions of the pair of discharge electrodes are each connected to the via conductor, peeling-off and melting of the opposing portion of the discharge electrode can be suppressed regardless of which one of the opposing portions is positioned on the side receiving electrons.

Preferably, the discharge electrode including the opposing portion connected to the one end portion of the via conductor is connected to one end portion of another via conductor at a position that is located on side opposite to the aforesaid via conductor with respect to the relevant discharge electrode and near the opposing portion of the relevant discharge electrode.

With that feature, since the via conductors are connected to both sides of the discharge electrode, the impacts and the heat generated with the discharge can be borne by the other via conductor as well. Therefore, stress and heat acting on the connection interface between the opposing portion of the discharge electrode and each via conductor can be mitigated, and the effect of suppressing the peeling-off and the melting of the opposing portion of the discharge electrode can be increased.

Preferably, the ESD protection device further comprises an auxiliary electrode containing a metallic material and a semiconductor material distributed therein, the auxiliary electrode extending along an opposing region where the opposing portions of the discharge electrodes face each other through a shortest distance.

With that feature, since electrons are apt to drift more easily in the opposing region in the event of discharge, a discharge phenomenon is generated more efficiently, and the discharge characteristics are stabilized.

According to the present invention, the degradation of discharge characteristics caused by repeated discharge can be suppressed.

DETAILED DESCRIPTION OF THE INVENTION

Embodiments of the present invention will be described below with reference to FIGS. 1 to 8.

Example 1

An ESD protection device 10 of EXAMPLE 1 is described with reference to FIGS. 1 to 3.

Figure 1:
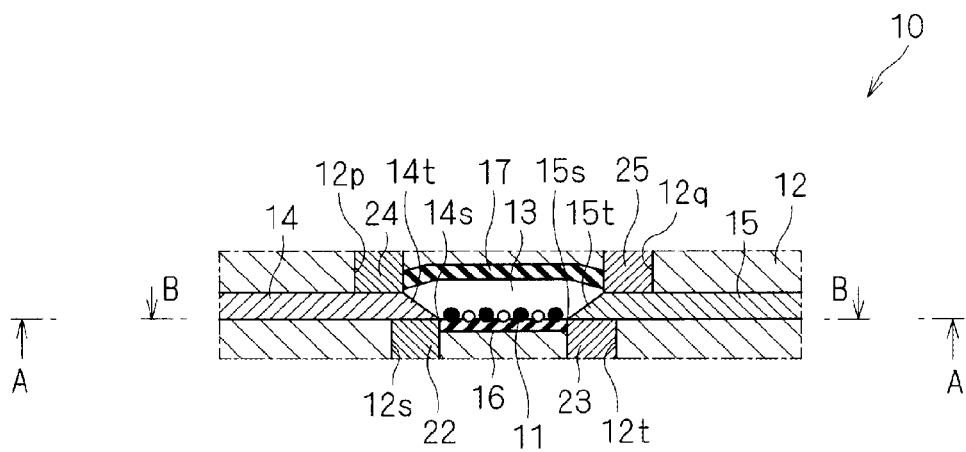
FIG. 1 is a partial sectional view of an ESD protection device, illustrating principal components. (EXAMPLE 1)

FIG. 1 is a partial sectional view of the ESD protection device 10, illustrating principal components. FIG. 2(*a*) is a partial sectional view taken along a line A-A in FIG. 1, and FIG. 2(*b*) is a partial sectional view taken along a line B-B in FIG. 1.

Figure 2A:
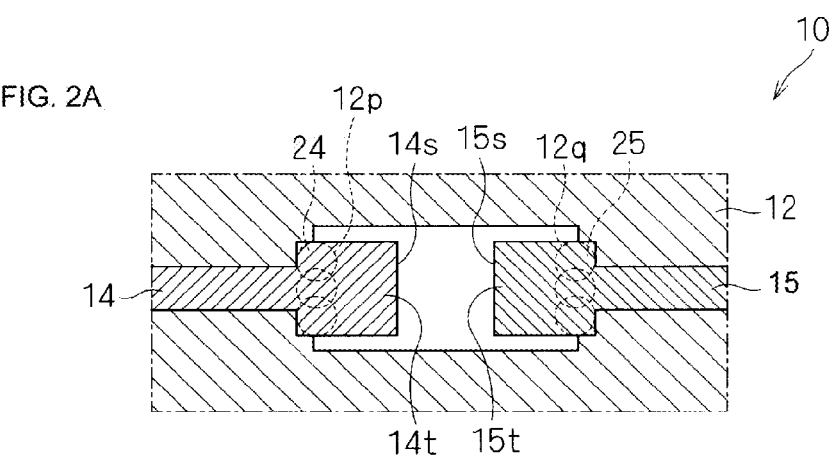
FIGS. 2A and 2B are partial sectional view of the ESD protection device, illustrating principal components. (EXAMPLE 1)
Figure 2B:
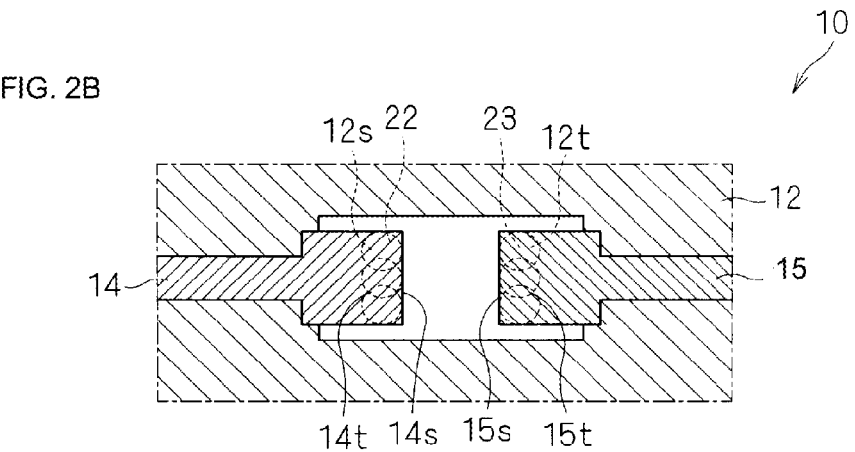

As illustrated in FIGS. 1 and 2A-2B, the ESD protection device 10 includes a cavity 13 formed in a ceramic multilayer substrate 12 in which a plurality of ceramic layers are stacked in the up and down direction in FIG. 1, and a pair of discharge electrodes 14 and 15. The discharge electrodes 14 and 15 are formed inside the ceramic multilayer substrate 12 and are connected to outer electrodes (not illustrated) that are formed on a surface of the ceramic multilayer substrate 12.

Sealing layers 16 and 17 are formed between the ceramic multilayer substrate 12 and the cavity 13. The sealing layers 16 and 17 function to inhibit diffusion of glass components contained in ceramics of the ceramic multilayer substrate 12 in a firing step, and to suppress excessive sintering of opposing portions 14*t* and 15*t* of the discharge electrodes 14 and 15. The sealing layers 16 and 17 may be omitted in a modified form.

The discharge electrodes 14 and 15 include the opposing portions 14*t* and 15*t*, which are formed along an inner surface of the cavity 13 and which face each other with a spacing held therebetween. The opposing portions 14*t* and 15*t* of the discharge electrodes 14 and 15 are connected to respective one ends of via conductors 22 and 23. As illustrated in FIGS. 1 and 2(*b*), the via conductors 22 and 23 are formed in sets of cylindrical through-holes 12*s* and 12*t* penetrating through the ceramic layer of the ceramic multilayer substrate 12 in overlapped relation. Thus, the via conductors 22 and 23 also penetrate through the ceramic layer of the ceramic multilayer substrate 12.

When an excessive voltage higher than a predetermined value is applied between the outer electrodes, discharge occurs inside the cavity 13, i.e., between the opposing portions 14t and 15t of the discharge electrodes 14 and 15. The discharge exerts impacts and heat on the opposing portions 14t and 15t of the discharge electrodes 14 and 15. With the discharge repeated, the opposing portions 14t and 15t of the discharge electrodes 14 and 15 may be peeled off from the inner surface of the cavity 13 or melted due to the impacts and heat generated with the discharge, whereby a distance between the opposing portions 14t and 15t of the discharge electrodes 14 and 15 is increased in some cases. Thus, discharge characteristics degrade.

In the structure that the via conductors 22 and 23 are connected respectively to the opposing portions 14t and 15t of the discharge electrodes 14 and 15, even when the opposing portions 14t and 15t of the discharge electrodes 14 and 15 are caused to peel off due to the impacts generated with the discharge, the peeling-off of the opposing portions 14t and 15t is suppressed by the presence of the via conductors 22 and 23 connected respectively to the opposing portions 14t and 15t. Furthermore, since part of the heat generated with the discharge is dissipated through conduction to the via conductors 22 and 23, thermal loads exerted on the opposing portions 14t and 15t of the discharge electrodes 14 and 15 are mitigated. Therefore, the opposing portions 14t and 15t of the discharge electrodes 14 and 15 are less likely to peel off from the inner surface of the cavity 13 and to melt, and variations of a gap between the opposing portions 14t and 15t of the discharge electrodes 14 and 15 are reduced. As a result, the degradation of the discharge characteristic can be suppressed.

As illustrated in FIGS. 1 and 2B, the via conductors 22 and 23 are connected to respective regions of the opposing portions 14t and 15t of the discharge electrodes 14 and 15, the regions including tips 14s and 15s that face each other through the shortest distance. The structure that the via conductors 22 and 23 are connected respectively to the tips 14s and 15s of the opposing portions 14t and 15t of the discharge electrodes 14 and 15 where the peeling-off is most likely to occur during the discharge is preferable in increasing the effect of suppressing the peeling-off and the melting of the opposing portions 14t and 15t of the discharge electrodes 14 and 15.

Figure 3:
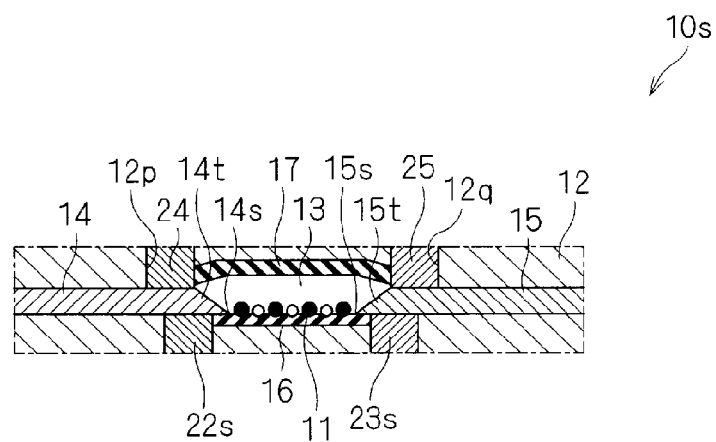
FIG. 3 is a partial sectional view of an ESD protection device, illustrating principal components. (Modification of EXAMPLE 1)

Alternatively, like an ESD protection device 10s according to a modification illustrated in a sectional view of FIG. 3, via conductors 22s and 23s may be connected to only regions away from the tips 14s and 15s of the opposing portions 14t and 15t of the discharge electrodes 14 and 15.

The discharge electrodes 14 and 15 are connected to respective one ends of other via conductors 24 and 25 at positions on the side opposite to the above-mentioned via conductors 22 and 23 with respect to the discharge electrodes 14 and 15 (i.e., on the upper side in FIG. 1) and near the opposing portions 14t and 15t. As illustrated in FIGS. 1 and 2A, the other via conductors 24 and 25 are formed in sets of cylindrical through-holes 12p and 12q penetrating through the ceramic layer of the ceramic multilayer substrate 12 in overlapped relation. Thus, the other via conductors 24 and 25 also penetrate through the ceramic layer of the ceramic multilayer substrate 12.

Because the impacts generated with the discharge can be borne by the via conductors 22, 23, 24 and 25 formed on both sides of the discharge electrodes 14 and 15, it is possible to mitigate stress and heat acting on interfaces at which the via conductors 22 and 23 are connected to the opposing portions 14t and 15t of the discharge electrodes 14 and 15, and to further increase the effect of suppressing the peeling-off and the melting of the opposing portions 14t and 15t of the discharge electrodes 14 and 15.

As symbolically denoted by ● and ○ in FIG. 1, an auxiliary electrode 11 in which a metallic material and a semiconductor material are distributed is formed along an opposing region where the tips 14s and 15s of the opposing portions 14t and 15t of the discharge electrodes 14 and 15 face each other through the shortest distance. When the metallic material and the semiconductor material of the auxiliary electrode 11 are arranged in a distributed state along the opposing region where electrons drift during the discharge, the electrons are apt to drift more easily. Therefore, the discharge phenomenon is generated more efficiently, and the discharge characteristics are stabilized.

The auxiliary electrode 11 may be formed in another region adjacent to the above-mentioned opposing regions. For instance, the auxiliary electrode 11 may be formed on the opposing portions 14t and 15t of the discharge electrodes 14 and 15 or between the opposing portions 14t and 15t of the discharge electrodes 14 and 15 and the sealing layer 16.

Example 2

An ESD protection device 10a of EXAMPLE 2 is described with reference to FIG. 4.

The ESD protection device 10a of EXAMPLE 2 has substantially the same structure as the ESD protection device 10 of EXAMPLE 1. The following description is made primarily about points different from EXAMPLE 1 while similar components to those in EXAMPLE 1 are denoted by the same reference symbols.

Figure 4:
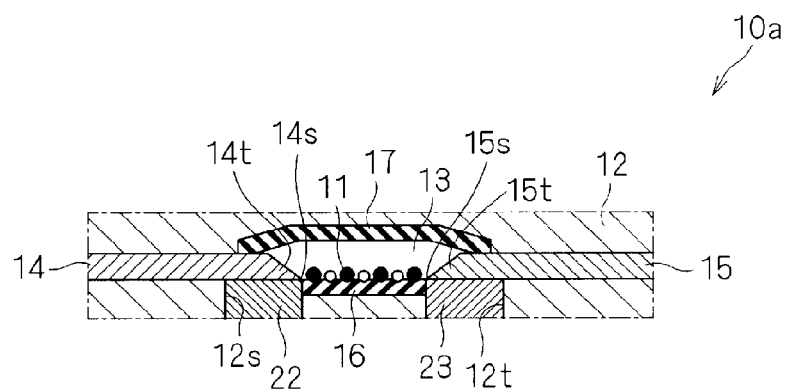
FIG. 4 is a partial sectional view of an ESD protection device, illustrating principal components. (EXAMPLE 2)

FIG. 4 is a partial sectional view of the ESD protection device 10a, illustrating principal components. In the ESD protection device 10a, as illustrated in FIG. 4, the via conductors 22 and 23 are connected respectively to the opposing portions 14t and 15t of the discharge electrodes 14 and 15 as in EXAMPLE 1. Unlike EXAMPLE 1, however, the discharge electrodes 14 and 15 are not connected to other via conductors at positions on the side opposite to the via conductors 22 and 23 with respect to the discharge electrodes 14 and 15 and near the opposing portions 14t and 15t.

The ESD protection device 10a can also suppress the degradation of the discharge characteristics caused by repeated discharge because peeling-off and melting of the opposing portions 14t and 15t of the discharge electrodes 14 and 15 are suppressed by the presence of the via conductors 22 and 23.

Example 3

An ESD protection device 10b of EXAMPLE 3 is described with reference to FIG. 5.

Figure 5:
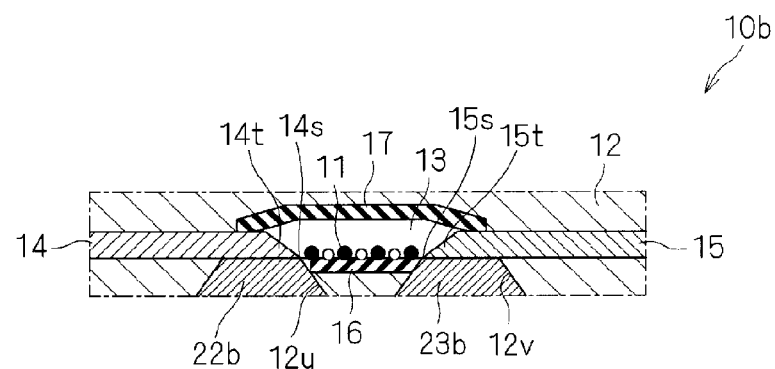
FIG. 5 is a partial sectional view of an ESD protection device, illustrating principal components. (EXAMPLE 3)

FIG. 5 is a partial sectional view of the ESD protection device 10b, illustrating principal components. In the ESD protection device 10b, as illustrated in FIG. 5, via conductors 22b and 23b are connected respectively to the opposing portions 14t and 15t of the discharge electrodes 14 and 15 as in EXAMPLE 2. Unlike EXAMPLE 2, however, the via conductors 22b and 23b are each formed in a tapered shape.

In more detail, conical through-holes 12u and 12v with diameters gradually reducing toward the opposing portions 14t and 15t of the discharge electrodes 14 and 15 are formed in the ceramic layer of the ceramic multilayer substrate 12, and the via conductors 22b and 23b are formed in the conical through-holes 12u and 12v, respectively. The conical through-holes 12u and 12v can be formed by laser processing, for example.

The via conductors 22b and 23b are connected at their one end portions having relatively small areas to the opposing portions 14t and 15t of the discharge electrodes 14 and 15. The via conductors 22b and 23b have section sizes gradually increasing away from the cavity 13, and they are inhibited from moving toward the cavity 13. Moreover, because the via conductors 22b and 23b gradually flare toward the side away from the cavity 13, heat is apt to dissipate more easily. As a result, peeling-off and melting of the opposing portions 14t and 15t of the discharge electrodes 14 and 15 are further suppressed by the presence of the via conductors 22b and 23b connected to the opposing portions 14t and 15t.

Example 4

An ESD protection device 10c of EXAMPLE 4 is described with reference to FIG. 6.

Figure 6:
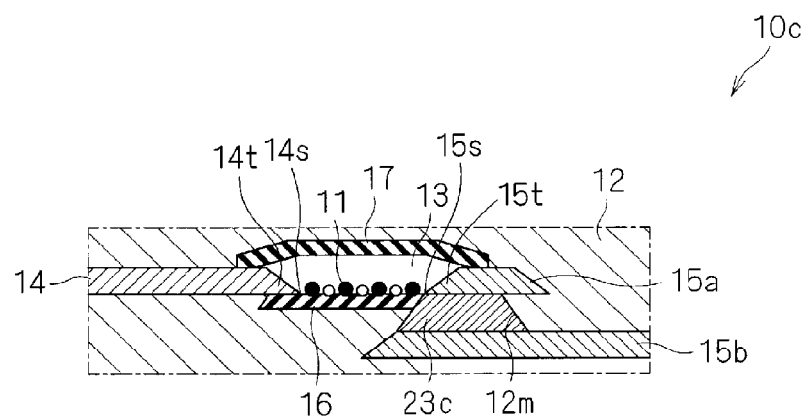
FIG. 6 is a partial sectional view of an ESD protection device, illustrating principal components. (EXAMPLE 4)

FIG. 6 is a partial sectional view of the ESD protection device 10c, illustrating principal components. In the ESD protection device 10c, as illustrated in FIG. 6, a via conductor is not connected to the opposing portion 14t of one discharge electrode 14.

The other discharge electrode includes a first portion 15a and a second portion 15b that are formed between different ceramic layers of the ceramic multilayer substrate 12. The first portion 15a of the other discharge electrode includes the opposing portion 15t.

The first portion 15a and the second portion 15b of the other discharge electrode are connected to each other through a via conductor 23c having a tapered shape. In more detail, a conical through-hole 12m with a diameter gradually reducing toward the first portion 15a of the other discharge electrode is formed in the ceramic layer of the ceramic multilayer substrate 12, and the via conductor 23c is formed in the through-hole 12m. The first portion 15a of the other discharge electrode is connected, in a region including the tip 15s of the opposing portion 15t, to one end portion of the via conductor 23c having a relatively small area. The second portion 15b of the other discharge electrode is connected to the other end portion of the via conductor 23c having a relatively large area.

In the case where the opposing portion 15t of the first portion 15a of the other discharge electrode receives electrons during the discharge, because the opposing portion 15t of the first portion 15a of the other discharge electrode is connected to the via conductor 23c, peeling-off and melting of the opposing portion 15t of the first portion 15a of the other discharge electrode is suppressed, whereby the degradation of the discharge characteristics caused by repeated discharge can be suppressed.

Additionally, by connecting another via conductor to the opposing portion 14t of the one discharge electrode 14, peeling-off of the opposing portion 14t of the one discharge electrode 14 can be suppressed when the opposing portion 14t of the one discharge electrode 14 receives electrons during the discharge.

Example 5

An ESD protection device 10d of EXAMPLE 5 is described with reference to FIGS. 7 and 8.

Figure 7:
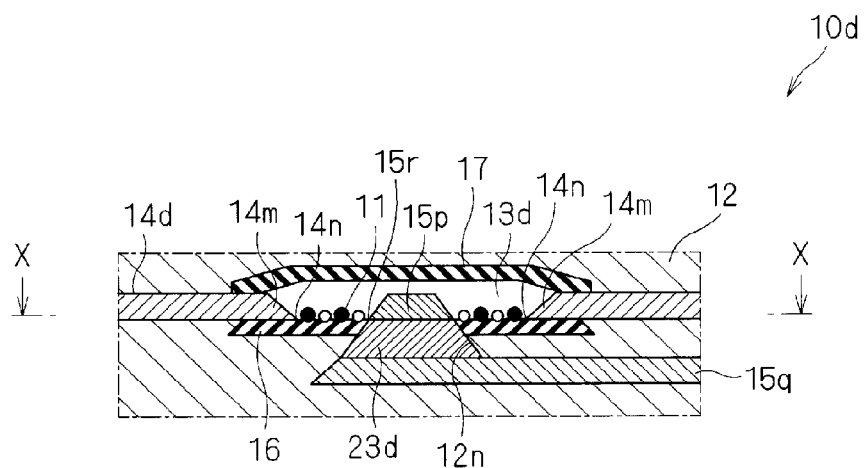
FIG. 7 is a partial sectional view of an ESD protection device, illustrating principal components. (EXAMPLE 5)

FIG. 7 is a partial sectional view of the ESD protection device 10d, illustrating principal components. FIG. 8 is a partial sectional view taken along a line X-X in FIG. 7.

Figure 8:
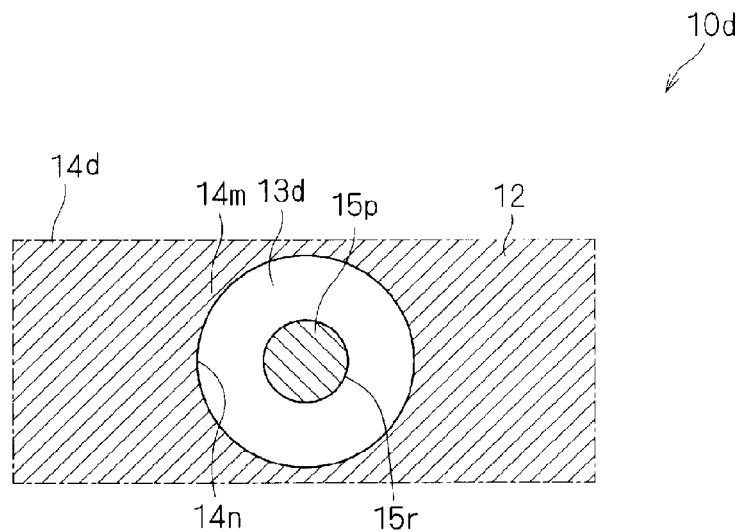
FIG. 8 is a partial sectional view of the ESD protection device, illustrating principal components. (EXAMPLE 5)
Figure 9A:
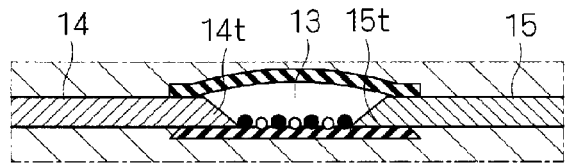
FIGS. 9A and 9B are partial sectional view of an ESD protection device, illustrating principal components. (Explanatory Example)
Figure 9B:
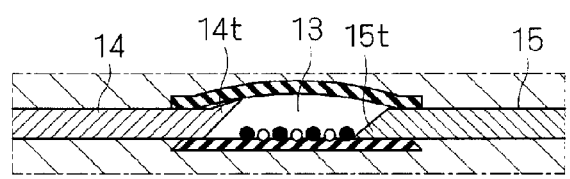
Figure 10:
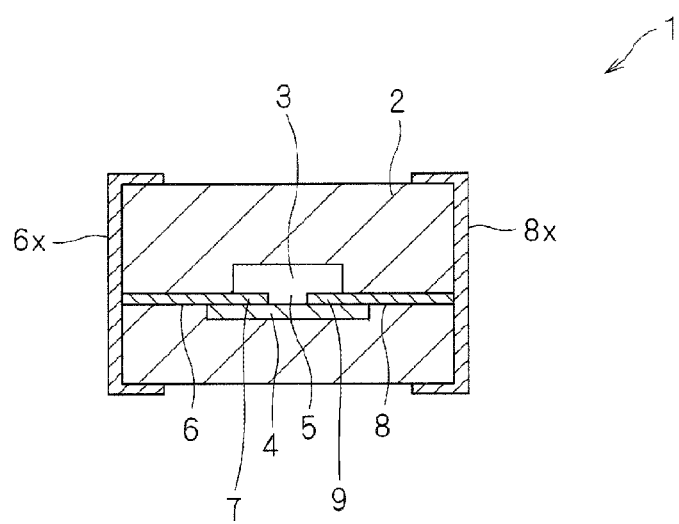
FIG. 10 is a sectional view of an ESD protection device. (Related Art)

In the ESD protection device 10d, as illustrated in FIGS. 7 and 8, a circular cavity 13d is formed inside the ceramic multilayer substrate 12. One discharge electrode 14d surrounds the cavity 13d and includes a ring-shaped opposing portion 14m that is exposed to an inner space of the cavity 13d.

The other discharge electrode includes a first portion 15p and a second portion 15q that are formed between different ceramic layers of the ceramic multilayer substrate 12.

The first portion 15p of the other discharge electrode is formed at a center of the cavity 13d, and the entire first portion 15p serves as an opposing portion. An outer peripheral edge 15r of the first portion 15p of the other discharge electrode and an inner peripheral edge 14n of the opposing portion 14m of the one discharge electrode 14d are formed in shapes of concentric circles and are arranged to face each other with a uniform spacing held therebetween.

The first portion 15p and the second portion 15q of the other discharge electrode are connected to each other through a via conductor 23d having a tapered shape. In more detail, a conical through-hole 12n with a diameter gradually reducing toward the first portion 15p of the other discharge electrode is formed in the ceramic layer of the ceramic multilayer substrate 12, and the via conductor 23d is formed in the through-hole 12n. The first portion 15p, i.e., the opposing portion, of the other discharge electrode is connected to one end portion of the tapered via conductor 23d having a relatively small area. The second portion 15q of the other discharge electrode is connected to the other end portion of the via conductor 23d having a relatively large area.

The via conductor 23d has a section size gradually increasing away from the cavity 13d, and the via conductor 23d is inhibited from moving toward the cavity 13d. Therefore, when the first portion 15p, i.e., the opposing portion, of the other discharge electrode, to which the via conductor 23d is connected, receives electrons during the discharge, peeling-off of the first portion 15p, i.e., the opposing portion, of the other discharge electrode is suppressed.

<Fabrication Example>

A fabrication example of the ESD protection device according to each of the above-described EXAMPLES will be described below.

(1) Preparation of Materials

A material with a composition mainly containing Ba, Al and Si is used as a ceramic material for the ceramic layers of the ceramic multilayer substrate. Individual material components are prepared and mixed at ratios to provide a predetermined composition, and the mixture is calcined at 800 to 1000° C. Resulting calcined powder is pulverized in a zirconia ball mill for 12 hours, whereby ceramic powder is obtained. An organic solvent, such as toluene or Ekinen (trade name), is added to and mixed with the ceramic powder. A binder and a plasticizer are further added to the ceramic powder, thus preparing slurry. A ceramic green sheet having a thickness of 50 μm is obtained by shaping the slurry, prepared as described above, with the doctor blade method.

Furthermore, an electrode paste to form the discharge electrode is prepared. The electrode paste is obtained by adding a solvent to a binder resin, which contains 80 wt % of Cu powder having a mean particle size of about 1.5 μm, ethylcellulose, etc., and by stirring and mixing the mixture using a roll.

A mixed paste to form the auxiliary electrode is obtained by blending Cu powder having a mean particle size of about 3 μm, as a metallic material, and silicon carbide (SiC) having a mean particle size of about 1 μm, as a semiconductor material, at a predetermined ratio, adding a binder resin and a solvent to the mixed powders, and by stirring and mixing the mixture using a roll. The mixed paste contains 20 wt % of the binder resin and the solvent, and remaining 80 wt % of the Cu powder and the silicon carbide.

Moreover, a resin paste to form the cavity is prepared in a similar manner. The resin paste is made of only a resin and a solvent. A resin capable of decomposing and disappearing when fired is used as a material of the resin paste. For example, PET, polypropylene, ethylcellulose, and acrylic resin can be used as the resin material.

A sealing-layer forming paste to form the sealing layer is prepared in a similar manner to that for preparing the electrode paste. The sealing-layer forming paste (alumina paste) is obtained, for example, by adding a solvent to a binder resin, which contains 80 wt % of $Al_2O_3$ powder having a mean particle size of about 1 μm, ethylcellulose, etc., and by stirring and mixing the mixture using a roll. A material, such as alumina, zirconia, magnesia, mullite, or quartz, having a higher sintering temperature than the material of the ceramic multilayer substrate is selected as a solid component of the sealing-layer forming paste.

(2) Coating of Paste by Screen Printing

A through-hole is formed in the ceramic green sheet, which serves as the ceramic layer adjacent to the discharge electrode, by employing a laser. The electrode past is then filled into the through-hole by screen printing, whereby a portion becoming the via conductor is formed. The through-hole may be formed by using a metal die.

Next, a portion becoming the sealing layer is formed by coating the sealing-layer forming paste on the ceramic green sheet, which serves as the ceramic layer adjacent to the discharge electrode, by screen printing.

Next, on the ceramic green sheet which serves as the ceramic layer adjacent to the discharge electrode, the mixed paste is coated in a predetermined pattern by screen printing to form the auxiliary electrode. For example, when the coating of the mixed paste has a large thickness, the mixed paste made of silicon carbide and Cu powder may be filled into a recess that has been formed in the ceramic green sheet in advance.

The electrode paste is coated on the relevant ceramic green sheet by screen printing to form the discharge electrodes including the opposing portions. In this fabrication example, the discharge electrodes are formed such that a width of each discharge electrode is 100 μm, and a discharge gap width (i.e., a size of the spacing between the tips of the opposing portions, which face each other) is 30 μm. Furthermore, the resin paste to form the cavity is coated by screen printing.

(3) Sacking and Press-Bonding

The ceramic green sheets are stacked and press-bonded into the ceramic multilayer substrate in a similar manner to that used in fabricating an ordinary ceramic multilayer substrate. In this fabrication example, the ceramic green sheets are stacked such that the ceramic multilayer substrate has a thickness of 0.3 mm, and that the opposing portions of the discharge electrodes and the cavity are positioned at a center of the substrate.

(4) Cutting and Coating of End-Surface Electrodes

The ceramic multilayer substrate is cut by employing a micro-cutter into chips in a similar manner to that used in obtaining a chip-type electronic component, such as an LC filter. In this fabrication example, the ceramic multilayer substrate is cut into chips each having sizes of 1.0 mm×0.5 mm. Thereafter, the electrode paste is coated on end surfaces of the ceramic multilayer substrate to form outer electrodes.

(5) Firing

Next, the ceramic multilayer substrate is fired in a $N_2$ atmosphere in a similar manner to that used in fabricating an ordinary ceramic multilayer substrate. When rare gas, e.g., Ar or Ne, is introduced to the cavity to lower a response voltage for the ESD, the ceramic multilayer substrate may be fired in a rare gas atmosphere of, e.g., Ar or Ne, in a temperature range where the ceramic material is contracted and sintered. When using an electrode material (e.g., Ag) that is not oxidized, the ceramic multilayer substrate may be fired in an atmosphere of ambient air.

The resin paste disappears with the firing, whereby the cavity is formed. In addition, not only the organic solvent in the ceramic green sheets, but also the binder resin and the solvent in the mixed paste disappear with the firing.

(6) Plating

Electrolytic Ni—Sn plating is performed on the outer electrodes in a similar manner to that used in obtaining a chip-type electronic component, such as an LC filter.

The ESD protection device is completed through the above-described steps.

The semiconductor material in the mixed paste is not limited to the above-mentioned particular material. Other examples of the semiconductor material include metal semiconductors such as silicon and germanium, carbides such as silicon carbide, titanium carbide, zirconium carbide, molybdenum carbide, and tungsten carbide, nitrides such as titanium nitride, zirconium nitride, chromium nitride, vanadium nitride, and tantalum nitride, silicides such as titanium silicide, zirconium silicide, tungsten silicide, molybdenum silicide, chromium silicide, and chromium silicide, borides such as titanium boride, zirconium boride, chromium boride, lanthanum boride, molybdenum boride, and tungsten boride, and oxides such as zinc oxide and strontium oxide. In particular, silicon and silicon carbide are preferable for the reason that they are comparatively inexpensive and are commercially available in a variety of particle sizes. The above-mentioned semiconductor materials may be used alone or a mixed state of two or more types as required. Moreover, the semiconductor material may be used in a state mixed with a resistance material, e.g., alumna or a BAS material.

The metallic material in the mixed paste is not limited to the above-mentioned particular material. The metallic material may be made of Cu, Ag, Pd, Pt, Al, Ni, W, Mo, an alloy of two or more selected from those elements, or a combination of two or more selected from those elements.

While the resin paste is coated to form the cavity, another type of material, e.g., carbon, may also be used instead of resin insofar as the material disappears with firing. Moreover, instead of printing a paste-like material, a resin film or the like may be attached to only a predetermined position.

Samples fabricated through the above-described steps were evaluated. The evaluation was conducted on samples of the ESD protection devices fabricated, in a similar manner to that in the fabrication example, according to EXAMPLE 1 in which one via conductor is connected to the opposing portion on the side including one of the discharge electrodes, and the other via conductor is connected to the opposing portion on the side including the other of the discharge electrodes, EXAMPLE 2 in which the via conductor is connected to only the opposing portion on the side including one of the discharge electrodes, EXAMPLE 3 in which the via conductor having the tapered portion is connected to only the opposing portion on the side including one of the discharge electrodes, EXAMPLE 4 in which the first portion and the second portion of the discharge electrode are connected to each other through the via conductor having the tapered shape, and EXAMPLE 5 in which the inner peripheral edge of one of the discharge electrodes and the outer peripheral edge of the first portion of the other discharge electrode are formed in shapes of concentric circles, and the first portion and the second portion of the other discharge electrode are connected to each other through the via conductor having the tapered shape. As COMPARATIVE EXAMPLE, an ESD protection device was fabricated in which the via conductor was removed from the ESD protection device of EXAMPLE 1.

An ESD response was evaluated for each sample. The ESD response was measured in accordance with the electrostatic discharge immunity test stipulated in the IEC standard IEC61000-4-2. A peak voltage during discharge was detected on the protection circuit side by applying 8 kV with contact discharge.

Furthermore, ESD repetition resistance was evaluated. After applying 8 kV with contact discharge 100 times, the ESD response was evaluated as described above.

Synthetic determination was rated to be bad (x) when, in the test of the ESD repetition resistance, the peak voltage detected on the protection circuit side was 700 V or more, good (○) when the peak voltage was 600 V or more and 700 V or less, and very good (⊙) when the peak voltage was less than 600 V.

The evaluation results are listed in Table 1 below.

TABLE 1

List of Evaluation Results

|  | ESD Response | ESD Repetition Resistance | Synthetic Determination |
|---|---|---|---|
| EXAMPLE 1 | 473 | 538 | ⊙ |
| EXAMPLE 2 | 476 | 552 | ⊙ |
| EXAMPLE 3 | 475 | 546 | ⊙ |
| EXAMPLE 4 | 489 | 574 | ⊙ |
| EXAMPLE 5 | 471 | 545 | ⊙ |
| COM. EXAMPLE | 482 | 768 | X |

The unit of numerical values (peak voltage) in column "ESD Response" and column "ESD Repetition Resistance" is V.

As seen from Table 1, the ESD repetition resistance is increased by connecting the via conductor to the opposing portion of the discharge electrode. The ESD repetition resistance is further increased by connecting the via conductor to not only the opposing portion of the discharge electrode, but also to the vicinity of the opposing portion of the discharge electrode. The ESD repetition resistance is even further increased by connecting the via conductor having the tapered shape to the opposing portion of the discharge electrode.

<Recapitulation>

As described above, the degradation of the discharge characteristics caused by repeated discharge can be suppressed by connecting the via conductor to the opposing portion of at least one of the discharge electrodes that are formed along the inner surface of the cavity.

It is to be noted that the present invention is not limited to the above-described embodiments, and that the present invention can be practiced in variously modified forms.

For instance, the via conductor may be formed in only one through-hole. The through-hole in which the via conductor is formed may have a shape other than the cylindrical and conical shapes.

10, 10a to 10d, 10s protection devices
11 auxiliary electrode
12 ceramic multilayer substrate
12m, 12n, 12p, 12q, 12s, 12t, 12u, 12v through-holes
13, 13d cavities
14, 14d discharge electrodes
14m opposing portion
14n inner peripheral edge
14s tip
14t opposing portion
15 discharge electrode
15a first portion
15b second portion
15p first portion
15q second portion
15r outer peripheral edge
15t opposing portion
15s tip
16, 17 sealing layers
22, 22b, 22s via conductors
23, 23b, 23c, 23d, 23s via conductors
24, 25 via conductors

What is claimed is:

1. An ESD protection device comprising:
a ceramic multilayer substrate including a plurality of laminated ceramic layers;
a cavity formed inside the ceramic multilayer substrate;
at least one pair of discharge electrodes including opposing portions that are formed along an inner surface of the cavity and that face each other with a spacing held therebetween; and
outer electrodes formed on a surface of the ceramic multilayer substrate and connected to the discharge electrodes,
wherein at least one of the opposing portions of the discharge electrodes is connected to one end portion of a first via conductor penetrating through the ceramic layer of the ceramic multilayer substrate, and
the first via conductor overlaps with at least some part of the cavity in a plan view.

2. The ESD protection device according to claim 1, wherein the opposing portion of one discharge electrode of the at least one pair of the discharge electrodes is connected to the one end portion of the first via conductor in a region including a tip of the opposing portion of the one discharge electrode, the tip facing the opposing portion of the other discharge electrode in a shortest distance.

3. The ESD protection device according to claim 1, wherein an area of the one end portion of the first via conductor connected to the opposing portion of the discharge electrode is smaller than an area of the other end portion of the via conductor.

4. The ESD protection device according to claim 1, wherein the opposing portions of the at least one pair of the discharge electrodes are each connected to the one end portion of the first via conductor and one end portion of a second via conductor.

5. The ESD protection device according to claim 1, wherein the discharge electrode including the opposing portion connected to the one end portion of the first via conductor is connected to one end portion of a third via conductor at a position that is located on a side opposite to the first via conductor with respect to the discharge electrode.

6. The ESD protection device according to claim 1, further comprising an auxiliary electrode containing a metallic material and a semiconductor material distributed therein, the auxiliary electrode extending along an opposing region where the opposing portions of the discharge electrodes face each other in a shortest distance.

7. The ESD protection device according to claim 2, wherein an area of the one end portion of the first via conductor connected to the opposing portion of the discharge electrode is smaller than an area of the other end portion of the via conductor.

8. The ESD protection device according to claim 2, wherein the opposing portions of the at least one pair of the discharge electrodes are each connected to the one end portion of the first via conductor and one end portion of a second via conductor.

9. The ESD protection device according to claim 3, wherein the opposing portions of the at least one pair of the discharge electrodes are each connected to the one end portion of the first via conductor and one end portion of a second via conductor.

10. The ESD protection device according to claim 2, wherein the discharge electrode including the opposing portion connected to the one end portion of the first via conductor is connected to one end portion of a third via conductor at a position that is located on a side opposite to the first via conductor with respect to the discharge electrode.

11. The ESD protection device according to claim 3, wherein the discharge electrode including the opposing portion connected to the one end portion of the first via conductor is connected to one end portion of a third via conductor at a position that is located on a side opposite to the first via conductor with respect to the discharge electrode.

12. The ESD protection device according to claim 4, wherein the discharge electrode including the opposing portion connected to the one end portion of the first via conductor is connected to one end portion of a third via conductor at a position that is located on a side opposite to the first via conductor with respect to the discharge electrode.

13. The ESD protection device according to claim 2, further comprising an auxiliary electrode containing a metallic material and a semiconductor material distributed therein, the auxiliary electrode extending along an opposing region where the opposing portions of the discharge electrodes face each other in a shortest distance.

14. The ESD protection device according to claim 3, further comprising an auxiliary electrode containing a metallic material and a semiconductor material distributed therein, the auxiliary electrode extending along an opposing region where the opposing portions of the discharge electrodes face each other in a shortest distance.

15. The ESD protection device according to claim 4, further comprising an auxiliary electrode containing a metallic material and a semiconductor material distributed therein, the auxiliary electrode extending along an opposing region where the opposing portions of the discharge electrodes face each other in a shortest distance.

16. The ESD protection device according to claim 5, further comprising an auxiliary electrode containing a metallic material and a semiconductor material distributed therein, the auxiliary electrode extending along an opposing region where the opposing portions of the discharge electrodes face each other in a shortest distance.

* * * * *